United States Patent [19]
Jinbo et al.

[11] Patent Number: 6,009,292
[45] Date of Patent: Dec. 28, 1999

[54] IMAGE READER

[75] Inventors: Noriyuki Jinbo, Toyohashi; Akira Takasu, Toyokawa; Morio Kinoshita, Toyokawa; Katsuhide Sakai, Toyokawa, all of Japan

[73] Assignee: Minolta Co., Ltd., Osaka, Japan

[21] Appl. No.: 08/955,504

[22] Filed: Oct. 22, 1997

[30] Foreign Application Priority Data

Oct. 25, 1996  [JP]  Japan .................................. 8-284006

[51] Int. Cl.⁶ .......................... G03G 21/00; G03G 21/16
[52] U.S. Cl. .......................... 399/208; 399/210; 399/211; 358/412; 358/486; 358/497
[58] Field of Search .................................. 399/208, 206, 399/209, 210, 211; 358/412, 410, 413, 474, 486, 497

[56] References Cited

U.S. PATENT DOCUMENTS

| | | | |
|---|---|---|---|
| 5,198,909 | 3/1993 | Ogiwara et al. | 358/412 |
| 5,583,620 | 12/1996 | Miyamoto | 355/235 |

FOREIGN PATENT DOCUMENTS

| | | |
|---|---|---|
| 59-102223 | 6/1984 | Japan . |
| 62-118794 | 5/1987 | Japan . |
| 64-051866 | 2/1989 | Japan . |
| 2-127865 | 5/1990 | Japan . |
| 4-95944 | 3/1992 | Japan . |

*Primary Examiner*—Richard Moses
*Attorney, Agent, or Firm*—Sidley & Austin

[57] ABSTRACT

A drive control mechanism for an image reader having a controller, to control a drive current impressed to a connected stepping motor such that the impression of the drive current is carried out in a prescribed number of steps, and a changer, to change a largest value of a drive current in response to a scanning speed of a reading device of the image reader. Consequently, smooth rotation with little torque ripple may be obtained through microstep driving, and by changing a largest drive current, control of a drive torque becomes easier, thus making it possible to maintain an even balance between load torque and drive vibration when a high-torque motor is used to eliminate slider vibration.

14 Claims, 9 Drawing Sheets

FIG. 7

| SIG. \ MAG. | x0.5 | x1.0 | x2.0 |
|---|---|---|---|
| SIG1 | H | L | L |
| SIG2 | L | H | L |
| SIG3 | H | L | L |
| SIG4 | L | H | L |
| CURRENT | 1.5A | 1.2A | 0.7A |

FIG. 8 (%)

| STEP \ MAG. \ PHA. | x0.5 | | x1.0 | | x2.0 | |
|---|---|---|---|---|---|---|
| | A | B | A | B | A | B |
| 0 | 100 | 0 | 100 | 0 | 100 | 0 |
| 1 | 93 | 40 | 100 | 20 | 100 | 10 |
| 2 | 71 | 71 | 93 | 40 | 100 | 20 |
| 3 | 40 | 93 | 83 | 55 | 96 | 30 |
| 4 | 0 | 100 | 71 | 71 | 93 | 40 |
| 5 | — | — | 55 | 83 | 88 | 47 |
| 6 | — | — | 40 | 93 | 83 | 55 |
| 7 | — | — | 20 | 100 | 77 | 63 |
| 8 | — | — | 0 | 100 | 71 | 71 |
| 9 | — | — | — | — | 63 | 77 |
| 10 | — | — | — | — | 55 | 83 |
| 11 | — | — | — | — | 47 | 88 |
| 12 | — | — | — | — | 40 | 93 |
| 13 | — | — | — | — | 30 | 96 |
| 14 | — | — | — | — | 20 | 100 |
| 15 | — | — | — | — | 10 | 100 |
| 16 | — | — | — | — | 0 | 100 |

IMAGE READER

BACKGROUND OF THE INVENTION

1. Field of the Invention

The present invention pertains to an image reader used in an original document reading unit of a copying machine, scanner, etc.

2. Description of the Related Art

In a copying machine using the mirror scan method, for example, an original document is placed on the platen glass of the original document reading unit of the copying machine, and by moving a scanner located below the platen glass parallel to the surface of the original document, the image of the original document is optically read.

If the speed of movement of the scanner (scanning speed) and the timing for the commencement of reading are unstable during this image reading, errors occur in the reproduced image and high-quality image formation cannot be achieved. Therefore, a stepping motor is used as the drive source for the scanner moving mechanism, and the control of the scanner's scanning speed, reading position, etc., is accurately performed using pulse control.

This type of stepping motor is driven to rotate by exciting groups of multiple stator coils (generally called "phases") located around the rotor through the impression of rectangular fixed-current drive pulses (full-step pulses), wherein these excited phases are alternated in a sequential manner. Methods of excitation include the single-phase excitation method in which only one phase is excited at any one time, the two-phase excitation method in which two phases are excited at any one time, or the alternating-phase excitation method in which these two methods are alternated.

However, in the drive control (hereinafter termed "rectangular wave driving") of the stepping motor using the full-step pulses, the drive current spikes abruptly each time the excited phases are alternated, thus causing the magnetic flux distribution inside the motor to change suddenly producing fluctuations in the drive torque (torque ripple), which cause unsmooth rotation leading to noise and vibration.

When vibration occurs, it is transmitted to the scanner via the power transmission mechanism, negatively affecting the accuracy of the image reading and causing blurry images.

To prevent this problem, U.S. Pat. No. 5,583,620 discloses a method to control the rotation of a stepping motor by dividing the rectangular drive pulses, that are sequentially impressed to the phases, into multiple steps so that the rectangular pulse will resemble a sine curve. This driving method, which is generally called the microstep driving method, is advantageous in that changes in the drive current at the rising and the falling of the pulse are mild, producing little fluctuation in the magnetic flux distribution. Therefore, torque ripple does not occur easily, allowing the rotor to rotate smoothly. Consequently, when the stepping motor is driven, noise and vibration are reduced making improved image reading accuracy possible.

On the other hand, with the popularization of automatic original document feeders that can continuously send multiple original documents to the image reading unit, it has become widely desired to increase both the efficiency of reading an original document and the rate of reproduction (hereinafter "CPM" or "copies per minute") of the copying machine. To meet this need, it is necessary to return the scanner as quickly as possible to the initial scan position after the scanner has read an original document.

In order to increase the return speed as described above, a high-torque stepping motor must be used, but in this case a new problem arises, i.e., slider vibration occurs in the scanner when scanning an original document.

In other words, during scanning of an original document, because the scanning speed is not particularly high, the torque necessary for the stepping motor can only be a fraction of that necessary when the scanner is returned to the initial scan position. However, by using the high-torque stepping motor described above, the balance between the drive torque of the stepping motor during scanning of an original document and the load torque during scanner movement is destroyed, and the scanner vibrates along the rails that slidably support the scanner (this phenomenon is hereinafter termed "slider vibration"), which de-synchronizes the scanning process and reduces the quality of the reproduced image.

In a copying machine offering different copy magnifications, the scanning speed at the largest magnification is extremely slow, this causes a disparity in the torque balance to be more pronounced, worsening the slider vibration, resulting in marked deterioration in the quality of the reproduced image.

When driving control is performed by means of the microstep driving method described above, the drive torque control capacity is limited to the number of microsteps into which the drive pulses are divided is increased, thereby increasing the resolution. Even where drive torque control by means of the microstep driving is possible to some extent, in a mechanism such as a copying machine in which a wide magnification range and minute variations in magnification are desired, the scanning speeds are set in correspondingly precise increments, thereby changing the load torque becomes complex, which not only requires that a CPU used for drive control be capable of very fast processing speeds and extremely high resolution, but also increases the amount of memory needed for storing the control programs, which increases cost considerably.

SUMMARY OF THE INVENTION

The present invention was made in consideration of the problems described above, and its object is to provide an image reader that can (i) set a drive torque to an optimal value in response to a level of scanning speed and (ii) read an original document with high accuracy.

In order to achieve the object, the image reader of the present invention comprises: a reading device that reads an image of an original document; a drive device that causes the reading device to move relative to the original document from an initial scan position parallel to the surface of the original document at a prescribed scanning speed by means of a stepping motor, a controller that controls a drive current impressed to the stepping motor such that the impression of the drive current is carried out in a prescribed number of steps, and a current changer that changes the largest value of the drive current in response to the scanning speed of the reading device.

The drive control apparatus of the present invention comprises: a driving device that causes a driven member to move in a prescribed direction at a prescribed speed from an initial drive position by means of a stepping motor, a controller that controls a drive current impressed to the stepping motor such that the impression of the drive current is carried out in a prescribed resolution power, and a changer that changes a largest value of the drive current and a resolution in response to the drive speed of the driven member.

BRIEF DESCRIPTION OF THE DRAWINGS

These and other objects and features of this invention will become clear from the following description, taken in conjunction with the preferred embodiments with reference to the accompanied drawings in which:

FIG. 7 is a drawing showing the relationships among control signals Sig1 through Sig4 from CPU 103 and the magnification and the largest drive current;

FIG. 8 is a drawing showing the current for each step during microstep driving in terms of a percentage of the largest drive current;

DETAILED DESCRIPTION OF THE PREFERRED EMBODIMENTS

An embodiment of the image reader pertaining to the present invention is explained below taking an example where the embodiment is employed in an analog copying machine.

(1) Construction of the Analog Copying Machine

Figure 1:
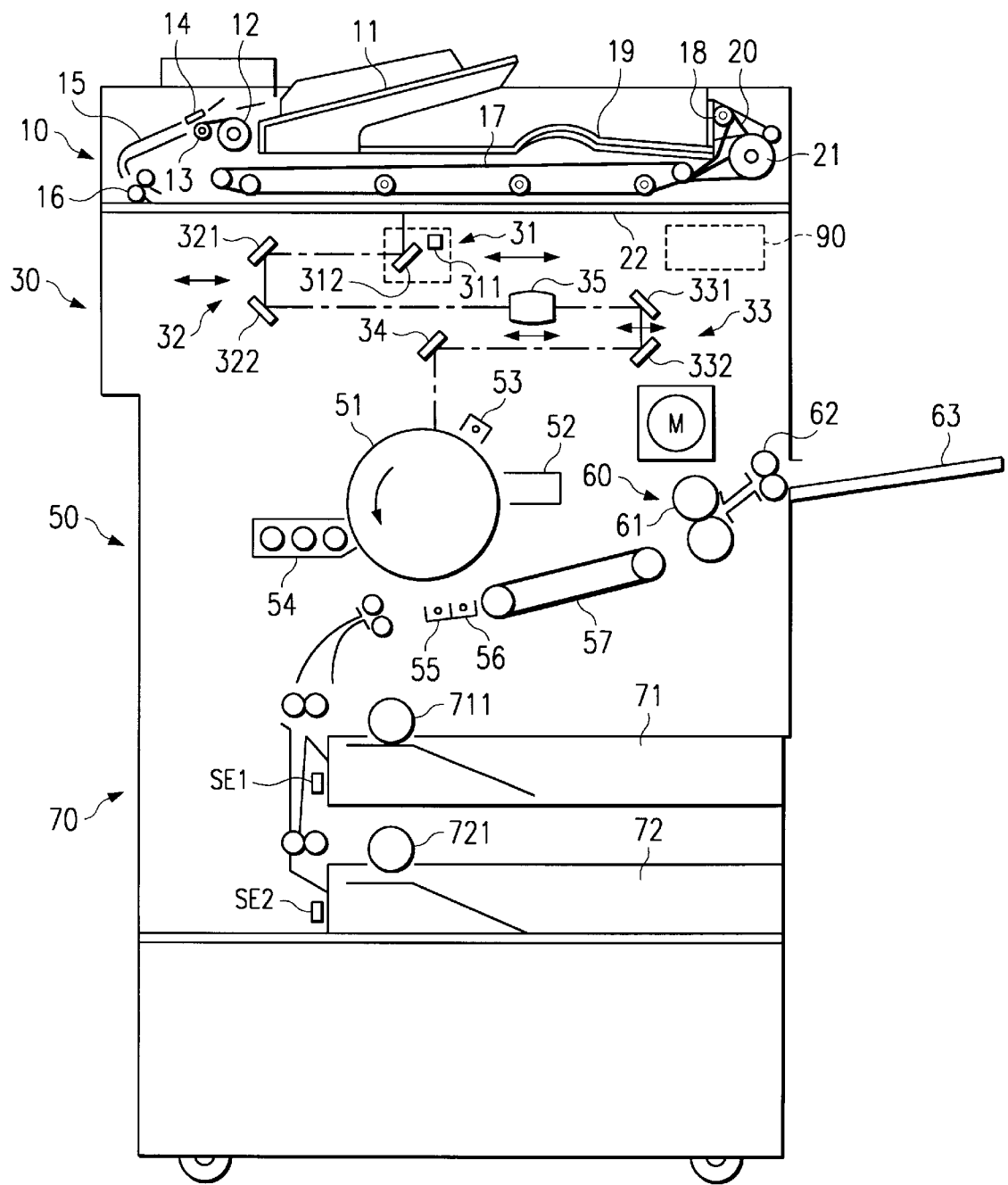
FIG. 1 is a drawing showing the construction of an analog copying machine in which the image reader pertaining to the present invention is applied.

First, the construction of the analog copying machine (hereinafter simply "copying machine") will be explained with reference to FIG. 1.

As shown in the drawing, this copying machine comprises automatic original document transfer 10 unit image reading unit 30, printing unit 50 and paper feeding unit 70.

Automatic original document transfer 10 unit is a device that automatically feeds multiple original documents one by one to image reading unit 30. Original documents placed on original document feeding tray 11 are sent downward along guide 15, one by one, by means of paper feeding roller 12, friction roller 13 and friction pad 14, and are transferred by means of resist roller 16 and transfer belt 17 to a prescribed image reading position that is set on platen glass 22.

The image of the original document that has been transferred to the image reading position is read by image reading unit 30. The original document is then again sent to the right in the drawing by means of transfer belt 17 and ejected onto original document eject tray 19 via paper eject roller 18.

Where the back side of the original document is to be read, the transfer path is alternated toward reverse roller 21 by alternating claw 20 so that the original document reverses direction and is moved back toward platen glass 22. The original document is further transferred by means of transfer belt 17 to the image reading position on platen glass 22.

When the back side of the original document has been read by image reading unit 30, transfer belt 17 is driven and the original document is transferred toward the right in the drawing. It is then ejected onto original document eject tray 19 based on the ejection operation described above, and the next original document on original document feeding tray 11 is fed and sent to the image reading position.

Figure 2:
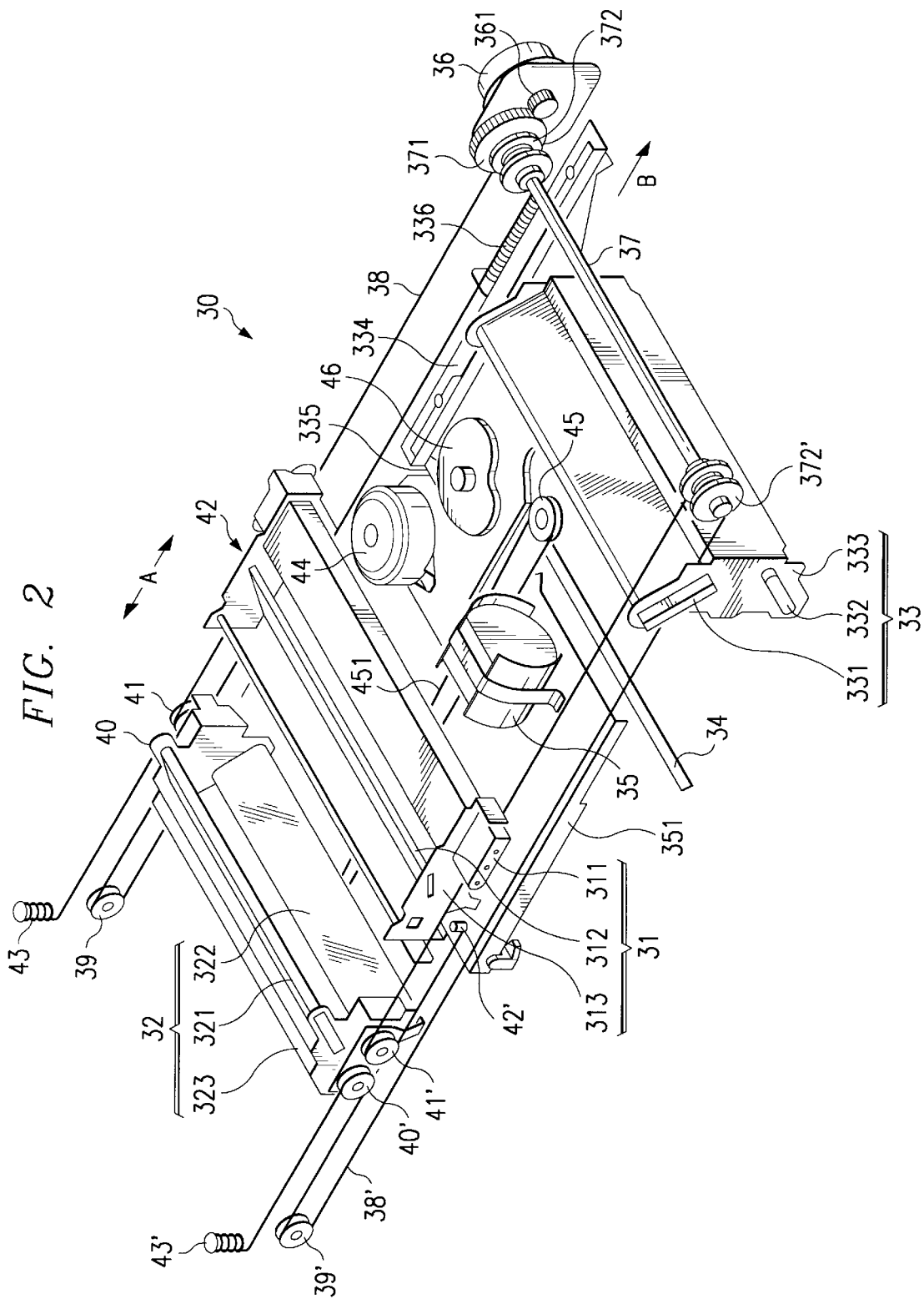
FIG. 2 is a perspective view showing the construction of the drive components for the image reading unit of the copying machine.

Image reading unit 30 has first slider unit (scanner) 31 that moves under platen glass 22 in the directions of the arrows in the drawing based on the driving of stepping motor 36 (see FIG. 2). Exposure lamp 311 and first mirror 312, which reflects in a direction parallel to platen glass 22 the light projected by exposure lamp 311 and reflected from the original document, are mounted on first slider unit 31. The reflected light further enters magnifying lens 35 via second and third mirrors 321 and 322. The light rays that pass through magnifying lens 35 expose and scan the surface of photoreceptor drum 51 via fourth and fifth mirrors 331 and 332 and sixth mirror 34.

Cleaning unit 52 removes residual toner on the surface of photoreceptor drum 51 before the photoreceptor drum is exposed as described above. Photoreceptor drum 51 is then exposed by an eraser lamp (not shown in the drawing) so that its charge is eliminated, and is then uniformly charged by charger 53. When exposed as described above while it is uniformly charged in this way, an electrostatic latent image is formed on its surface.

Developer unit 54 contains a developer comprising two components, i.e., black toner and a carrier. It supplies toner to develop the electrostatic latent image formed on the surface of photoreceptor drum 51 to form a toner image.

On the other hand, two paper cassettes 71 and 72 are housed in paper feeding unit 70. The size of the copy paper housed in these cassettes is detected by paper size detecting photoelectric sensors SE1 and SE2.

In synchronization with the exposure and developing operations described above involving photoreceptor drum 51, copy paper of a needed size is fed from either of paper cassettes 71 and 72 based on the driving of paper feeder roller 711 or 712. The paper comes into contact with the surface of photoreceptor drum 51 at the bottom of the drum, whereupon the toner image formed on the surface of photoreceptor drum 51 is transferred to the surface of the copy paper due to the electrostatic force of transfer charger 55.

The copy paper is then separated from the surface of photoreceptor drum 51 by means of separating charger 56 and is transferred to fusing unit 60 by means of transfer belt 57.

The toner image transferred to the copy paper is in an unstable condition in which the toner image comes off easily if touched. Therefore, it is fused onto the paper in fusing unit 60 by applying heat and pressure by means of fuser roller 61 which contains a heater inside it in order to cause toner particles to penetrate into the gaps between the paper fibers. The copy paper that has undergone fusing is ejected onto paper eject tray 63 by means of eject roller 62.

Operation panel 90 (indicated by a dotted line in FIG. 1) is located in an accessible area of the front surface of the copying machine. This operation panel is equipped with various input keys including a copy start key to instruct the copying machine to start copying and numeric keys to set the number of copies, as well as with a display window to display the set parameters.

FIG. 2 is a perspective view showing the construction of the drive components of image reading unit 30. Image reading unit 30 is equipped with first slider unit 31, second slider unit 32 and third slider unit 33. Each slider unit is slidably supported at either end by rails (not shown in the drawing) that are aligned in the directions of secondary scanning (indicated by arrows A).

First slider unit 31 works as a scanner, as described above, and comprises exposure lamp 311, first mirror 312 and first slider 313 that supports the two components. Second slider unit 32 comprises second mirror 321 and third mirror 322, as well as second slider 323 that supports these mirrors such that their mirror surfaces are maintained at right angles to each other. Similarly, third slider unit 33 comprises fourth mirror 331 and fifth mirror 332, as well as third slider 333 that supports these mirrors such that their mirror surfaces are maintained at right angles to each other. The positional relationships among these mirrors 312, 321, 322, 331 and 332 are shown in FIG. 1, and these mirrors, as well as sixth mirror 34, lead the light projected by exposure lamp 311 and reflected from the surface of the original document to the surface of photoreceptor drum 51.

The driving mechanism to move the first slider unit 31 and second slider unit 32 back and forth will now be explained.

Stepping motor 36 is used as the drive source for the movement. Stepping motor 36 rotates, via pinion 361 and flat gear 371, shaft 37 that is rotatably supported by a bearing that is not shown in the drawing. Pulleys 372 and 372' are fixed to either end of shaft 37 and rotate together with shaft 37. Wires 38 and 38' are respectively suspended between these pulleys 372 and 372' and pulleys 39 and 39' that are mounted at the opposite side from pulleys 372 and 372' in the directions of secondary scanning. The ends of first slider unit 31 are fixed to the middle parts of wires 38 and 38'.

On the other hand, pairs of pulleys 40, 41 and 40', 41' are mounted to either side of second slider 323 using shafts, and wires 38 and 38' are suspended over these pulleys 40, 41 and 40', 41' in the manner shown in the drawing.

One end of wires 38 and 38' is fixed to the housing of image reading unit 30 by means of fixing pins 42 and 42'. The other end is fixed to one end of coil springs 43 and 43' such that wires 38 and 38 are subject to an appropriate tension.

Using the construction described above, when stepping motor 36 drives the movement, wires 38 and 38' move via pulleys 372 and 372', and as the wires move, first slider unit 31 and second slider unit 32 move. When this occurs, second slider unit 32 moves in the same direction as first slider unit 31 at half its speed due to the functioning of pulleys 40, 41 and 40', 41'.

As a result, when first slider unit 31 moves for the purpose of scanning the original document, the length of the light path from first mirror 312 to magnifying lens 35 is kept constant and the image formation position established by means of magnifying lens 35 may be maintained on the surface of photoreceptor drum 51 at all times.

When scanning of the original document by means of first slider unit 31 is completed, stepping motor 36 is driven backward such that the first slider unit will return to the initial scan position. Second slider unit 32 also returns to the initial position at the same time.

Drive motor 44 moves magnifying lens 35 and third slider unit 33 in order to change the magnification. The rotation of drive motor 44 is transmitted to pulley 45 and magnification changing cam 46 via a drive force transmission mechanism not shown in the drawing, whereupon the 45 pulley and magnification changing cam 46 are rotated at their prescribed rotation speeds.

Wire 451 is suspended over pulley 45 and another pulley that is mounted away from the pulley in the directions of secondary scanning (but not shown in the drawing). Lens platform 351, to which magnifying lens 35 is mounted, is fixed to the middle part of wire 451. Lens platform 351 can move back and forth in the directions of secondary scanning by means of a sliding mechanism not shown in the drawing, and moves together with wire 451 as pulley 45 rotates. Based on the movement, the length of the light path from first mirror 312 (the surface of the original document to be exact) and magnifying lens 35 is changed in order to change the magnification of the reproduced image.

Arm member 334 that extends along the directions of secondary scanning is mounted to the side of third slider 333, the side being farther away in the drawing. Contact member 335 that comes into contact with the edge of magnification changing cam 46 is fixed to the tip of arm member 334. On the other hand, extension spring 336 is pulling arm member 334 in a direction indicated by arrow B, so that contact member 335 is in contact with the edge of magnification changing cam 46 at all times. As magnification changing cam 46 rotates, arm member 334 and third slider 333 move by a prescribed amount.

Third slider unit 33 moves by a required amount in synchronization with the movement of magnifying lens 35 due to the mechanism described above, and the length of the light path from magnifying lens 35 to photoreceptor drum 51 is appropriately adjusted to allow the image of the original document to be formed on the surface of photoreceptor drum 51 at all times, whereupon the magnification is easily changed.

(2) Construction of Control Unit 100

Figure 3:
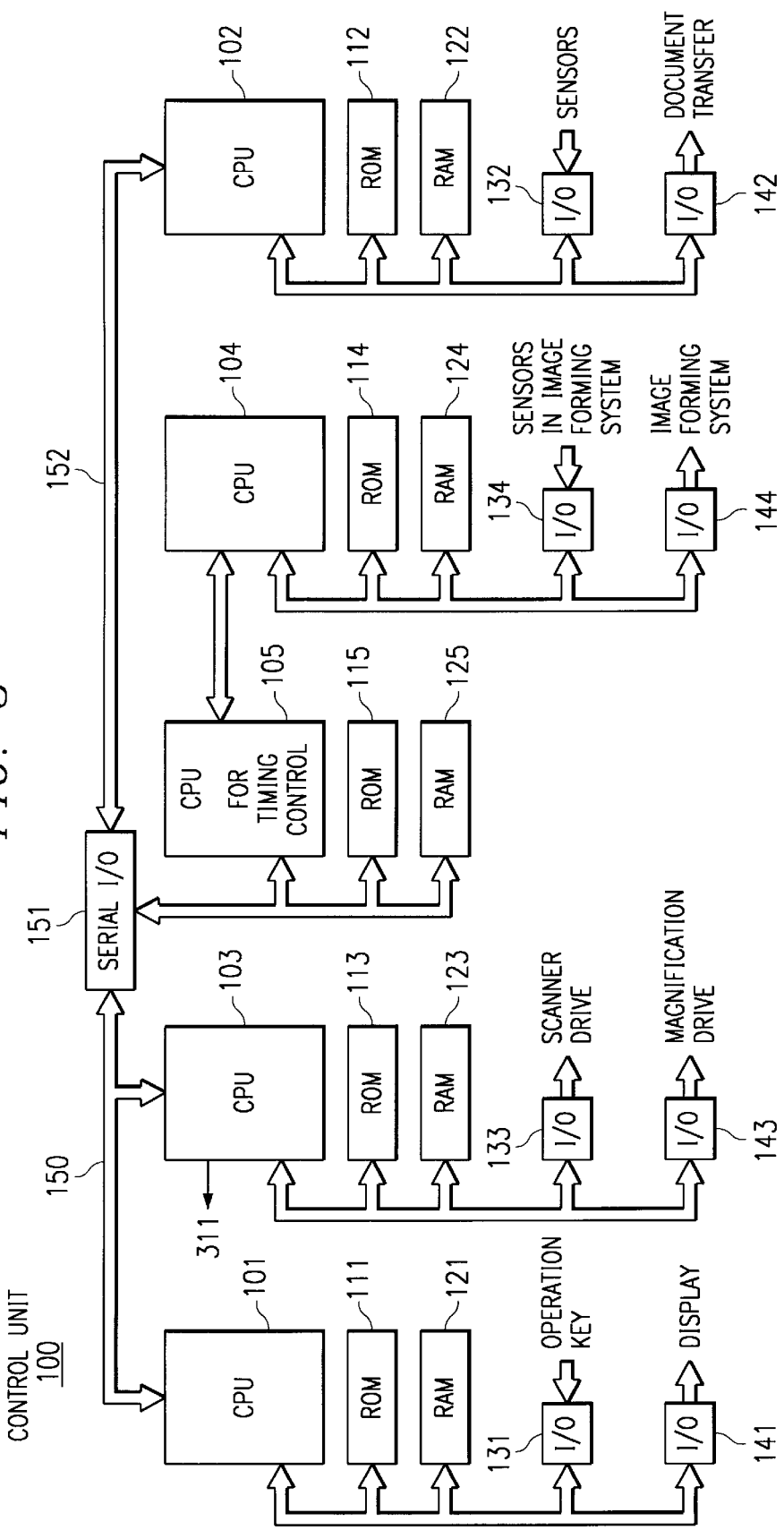
FIG. 3 is a block diagram of the control unit inside the copying machine.

The construction of control unit 100 that is mounted inside the copying machine described above will now be explained with reference to the block diagram shown in FIG. 3.

Control unit 100 primarily comprises five CPUs 101 through 105. CPUs 101 through 105 contain ROMs 111 through 115 respectively, in which programs necessary for their control routines are stored, as well as RAMs 121 through 125 that function as work areas for the execution of the programs.

CPUs 101 through 105 are connected to one another via data buses 150 and 152 as well as serial I/O port 151. Data and commands may be mutually sent and received through interrupt control. When power is turned ON for the main unit of the device, CPUs 101 through 105 each read the initialization programs stored in their ROMs to initialize internal registers and RAMs. At the same time, the counting of time using an internal timer is begun in order to ensure that the time taken for each routine falls within the prescribed time period.

The constructions and operations of the various components of control unit 100 will now be explained in the order of reception of key input on operation panel 90 by the user, reading of the original document, processing of the image data and printing.

CPU 101 transmits the instructions from operation panel 90 to other CPUs and controls the display on operation panel 90. In other words, based on the control program stored in ROM 111, it sends the signals from various operation keys on operation panel 90 to the other CPUs via I/O port 131, and controls the display in the display window on operation panel 90 based on the information received from other CPUs via I/O port 141.

When a desired mode is set by means of operation panel 90 and an instruction to start copying is received, CPU 102 controls the operation of automatic original document transfer unit 10 to feed an original document onto platen glass 22 of image reading unit 30. In other words, when the instruction to start copying is received from operation panel 90, CPU 102 first checks whether original documents are present on original document feeding tray 11 by means of a photoelectric sensor not shown in the drawing, and when the presence of original documents is confirmed, CPU 102 drives the rollers and transfer belt 17 of automatic original document transfer unit 10 in the manner described above to send an original document to the image reading position on platen glass 22 based on a control program stored in ROM 112.

When the original document reaches the image reading position in this way, CPU 102 notifies CPU 105 accordingly, and based on this notification, CPU 105 sends a scan request to CPU 103 at the appropriate timing.

CPU 103, after receiving the scan request, performs control regarding the image reading and scanning performed by image reading unit 30. In other words, it reads out the program needed for the control from ROM 113, and based on this program, CPU 103 issues various control signals at the appropriate timing. It turns ON exposure lamp 311 while it issues control signals to scanner drive circuit 200 described below via I/O port 133 to control the rotation of stepping motor 36, causing first slider unit 31 to move at a prescribed scanning speed to scan the original document. After the original document is read, CPU 103 immediately returns first slider unit 31 to the initial scan position.

Where the user sets the magnification in advance via operation panel 90, CPU 103 gives control signals to the magnification drive circuit via I/O port 143 prior to the scanning of the original document, so that drive motor 44 will be driven to move magnifying lens 35 and third slider unit 33 in order for the specified magnification to be attained.

The image of the original document that is obtained through the scanning operation described above is formed, by means of the optical system of image reading unit 30, on the surface of photoreceptor drum 51 that rotates at a prescribed peripheral velocity, whereupon an electrostatic latent image is formed. The electrophotographic process described above is then performed in accordance with the printing control carried out by CPU 104, and an image is formed on the copy paper.

In other words, a program for printing control is stored in ROM 114, and CPU 104 reads out this program to carry out control via I/O port 144 of the rotation of main motor M and the turning ON/OFF of a clutch mechanism (not shown in the drawing) that transmits the rotation of the motor to photoreceptor drum 51 and the rollers of transfer belt 57, thereby carrying out printing onto the copy paper.

During this process, detection signals from various sensors in the image formation system are input to CPU 104 via I/O port 134. For example, it adjusts the output from charger 53 or transfer charger 55 based on detection signals from a darkness detection sensor that detects the amount of toner adhering to photoreceptor drum 51, as well as detection signals from such other sensors as a temperature sensor or humidity sensor (none of these sensors are shown in the drawing), such that an optimal reproduced image may be obtained. CPU 104 also selects either paper cassette 71 or paper cassette 72 based on the detection signals from paper size detection sensors SE1 and SE2 in order to perform control of the paper feeding operation, or it detects a paper jam based on detection signals from a paper jam detection sensor not shown in the drawing and causes the display window on operation panel 90 to indicate the presence of the paper jam via CPU 101.

The control operations by CPUs 101 through 104 described above are carried out based on timing control by CPU 105. CPU 105 reads out a required control program from ROM 115 and causes the processing routines for the entire device to be performed in a unified fashion while monitoring the time by means of an internal timer so that the copying operation will take place in a smooth fashion.

(3) Construction of Scanner Drive Circuit 200

Figure 4:
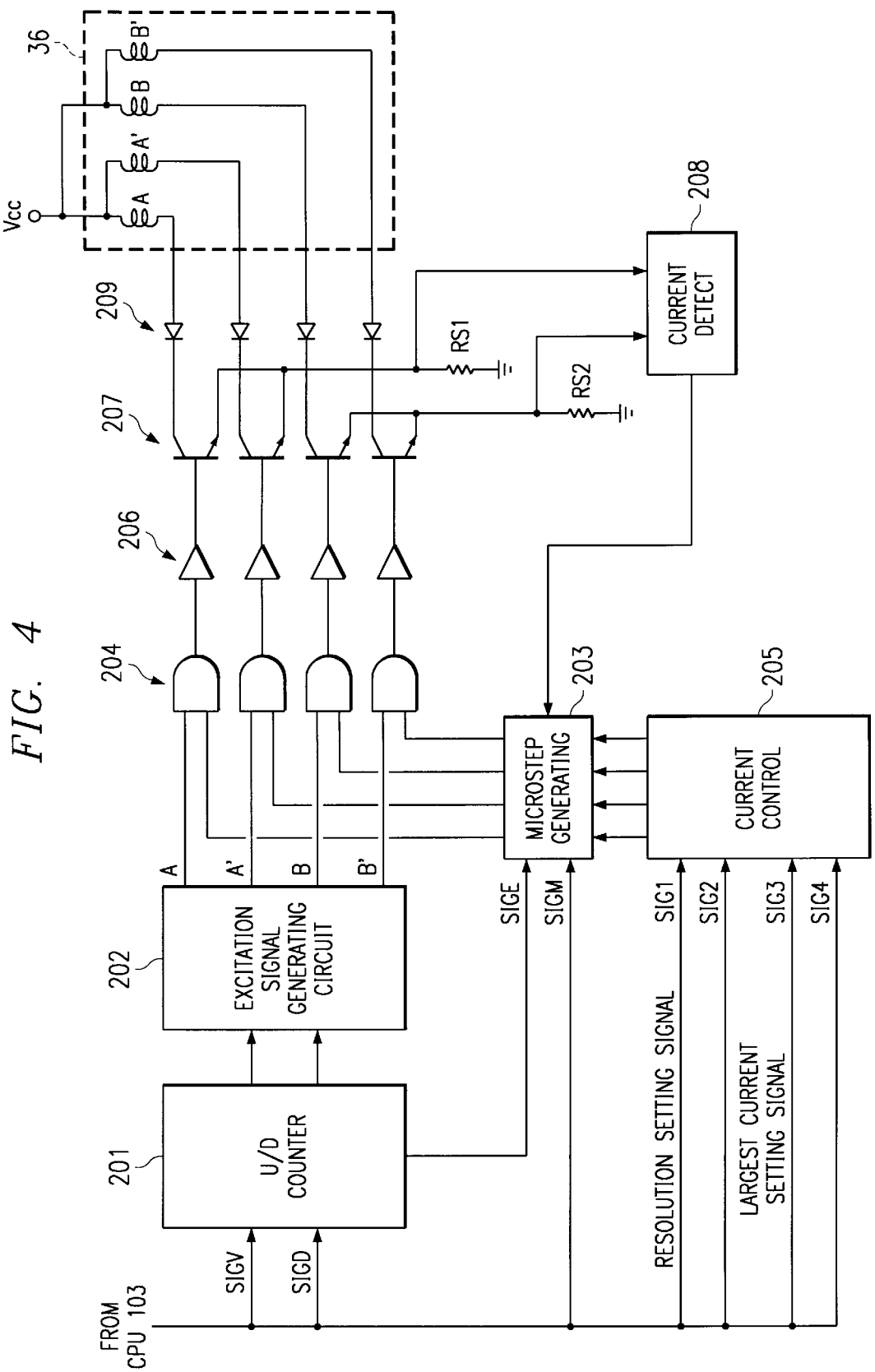
FIG. 4 is a block diagram of the scanner drive circuit in the control unit.

FIG. 4 is a block diagram of scanner drive circuit 200 to drive stepping motor 36 based on control signals from CPU 103 so that first slider unit 31 and second slider unit 32 will be moved appropriately for the intended purpose.

As shown in the drawing, scanner drive circuit 200 comprises up and down (U/D) counter 201, excitation signal generating circuit 202, microstep generating circuit 203, AND circuits 204, current control circuit 205, buffer amps 206, transistors 207, current detecting circuit 208 that detects the values of the current that flows to each of the phases of stepping motor 36, diodes 209 to protect transistors 207 and bias resistors RS1 and RS2.

Stepping motor 36 is a two-phase motor and its stator coils comprise phases A and B as well as phases A' and B'.

Speed setting signal SigV that is output from CPU 103 is given in the form of a clock signal in order to instruct stepping motor 36 to begin rotation operations such as acceleration, constant speed rotation, reduction and return to the initial position. The clock signal cycle is changed depending on the speed required. The clock signal cycle becomes shorter as the speed increases. Rotation direction setting signal SigD is given in the form of a level signal that has a high level "H" or low level "L". For example, when the signal is in "L" mode, the motor is rotated clockwise (CW), while when the signal is in "H" mode, the motor is rotated counterclockwise (CCW).

Figure 6:
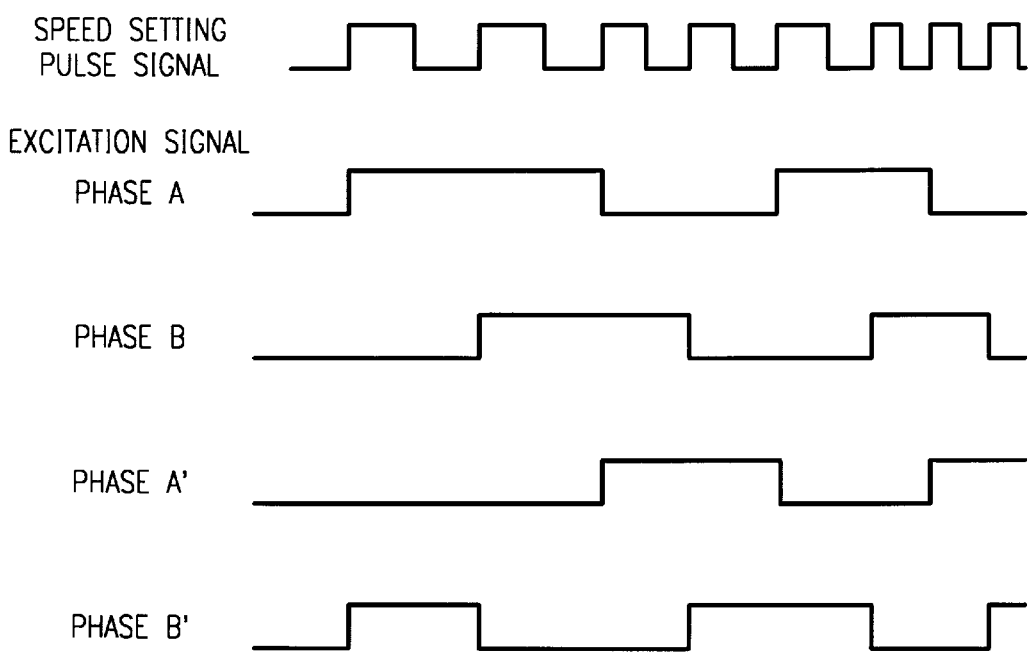
FIG. 6 is a drawing showing the relationship between the speed setting pulse signals and excitation signals.

When the speed setting signals SigV and rotation direction setting signal SigD (CW signal, for example) are input to U/D counter 201, U/D counter 201 divides speed setting signals SigV and generates speed setting pulse signals as shown at the top of FIG. 6. At each rising edge of the pulse signal, U/D counter 201 outputs excited phase alternating signal SigE to excitation signal generating circuit 202 and microstep generating circuit 203 described below and sends rotation direction setting signal SigD to excitation signal generating circuit 202.

Figure 5:
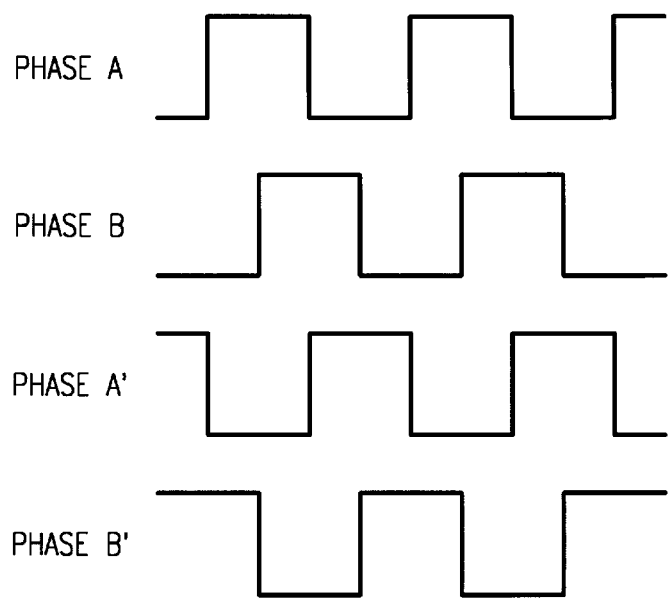
FIG. 5 is a drawing showing changes in the excitation signals for each of the phases in two-phase excitation driving.

Each time an excited phase alternating signal SigE is received, excitation signal generating circuit 202 generates a basic excitation signal to carry out two-phase excitation, as shown in FIG. 5, in order to cause stepping motor 36 to rotate clockwise, and outputs the excitation signal to each of AND circuits 204.

When a CCW signal is received, the excitation signal generating circuit 202 generates excitation signals that cause phase alteration in the reverse order from the example shown in FIG. 5 and performs control such that stepping motor 36 will rotate counterclockwise.

Excitation signal generating circuit 202 generates basic excitation signals for two-phase excitation in the manner described above. As shown in FIG. 6, the shorter the cycles of the speed setting pulse signals (i.e., the faster the required rotational speed), the shorter the cycles of the excitation signals also become.

Microstep generating circuit 203 is a circuit that generates signals that are input to each AND circuit 204 together with the basic excitation signals. Depending on the nature of these signals, either rectangular wave driving or microstep driving is selected and executed.

Current control circuit 205 determines the largest drive current and the number of step divisions for the drive pulse during microstep driving and sends this information to microstep generating circuit 203 to enable minute microstep drive control.

The overall control operation will now be explained below with primary emphasis on microstep generating circuit 203 and current control circuit 205.

In this embodiment, microstep driving for minimal vibration is performed during the scanning of the original document, and rectangular wave driving in which a large amount of torque is available is used in other situations where fast movement is more important than minimal vibration, including the time that first slider unit 31 is returned to the initial scan position.

First, during rectangular wave driving, "L" mode setting signal SigM is input from CPU 103 to microstep generating circuit 203. Microstep generating circuit 203 outputs a rectangular wave ON signal to each AND circuit 204 based on the timing indicated by excited phase alternating signals SigE that are input from U/D counter 201. Therefore, each AND circuit 204 outputs a rectangular pulse that is identical to that shown in FIG. 5 to buffer amp 206 without any processing. After being amplified to a voltage value optimal to drive each transistor 207 described below, the pulse is impressed to the base of each transistor 207, in which a prescribed current flows from the collector to the emitter.

Because the flow of current to each transistor 207 is controlled based on the presence or absence of the ON/OFF signals output from each AND circuit 204, i.e., excitation signals as shown in FIG. 5, full-step driving pulses similar to the pulses of the excitation signals are impressed to the phases of stepping motor 36, which is then driven with a large torque.

A case in which microstep driving is performed will now be explained. In microstep driving, an "H" level signal is sent from CPU 103 to microstep generating circuit 203 as mode setting signal SigM while resolution setting signals Sig1 and Sig2 and largest current setting signals Sig3 and Sig4 are sent to current control circuit 205.

Resolution setting signals Sig1 and Sig2 and largest current setting signals Sig3 and Sig4 are control signals to set the number of microsteps and the largest drive current for microstep driving respectively, and are given in the form of "H" or "L" level signals.

On the other hand, the internal memory of current control circuit 205 has tables as shown in FIGS. 7 and 8, which are used for microstep control. FIG. 7 shows a table to set the magnification and the current value for the drive pulse when magnification is used (this current value will be referred to as "largest drive current" because it is the largest drive current for each drive pulse) based on resolution setting signals Sig1 and Sig2 and largest current setting signals Sig3 and Sig4 that are input from CPU 103. The largest drive current is set such that it becomes smaller as the magnification increases.

FIG. 8 shows a table that indicates the number of step divisions in a half-interval of the phase alternating signal for phases A and B in various magnification situations, as well as the size of the current for each step as a percentage of the largest drive current.

Current control circuit 205 determines the magnification based on the combination of "H" and "L" in resolution setting signals Sig1 and Sig2 by referring to the upper half of the table shown in FIG. 7. It also determines the largest drive current for the microstep operation based on the combination of "H" and "L" in largest current setting signals Sig3 and Sig4 by referring to the lower half of the table shown in FIG. 7. It then refers to the table shown in FIG. 8 and transmits the number of step divisions for the chosen magnification and the percentage of the current in each step relative to the largest drive current to microstep generating circuit 203 as table data.

In response to the input of speed setting signals SigV from CPU 103 and the table data regarding the number of steps and the largest drive current, microstep generating circuit 203 divides the phase alternating interval by the number of step divisions, and seeks the drive current for each step. It then calculates the number of ON clock signals (the number of ON clock signals to be generated for the interval of one step) necessary based on the drive current, and outputs the number of ON clock signals for each step to AND circuit 204 at each rising edge of the phase alternating signal from U/D counter 201, whereupon a microstep waveform is generated.

Figure 9:
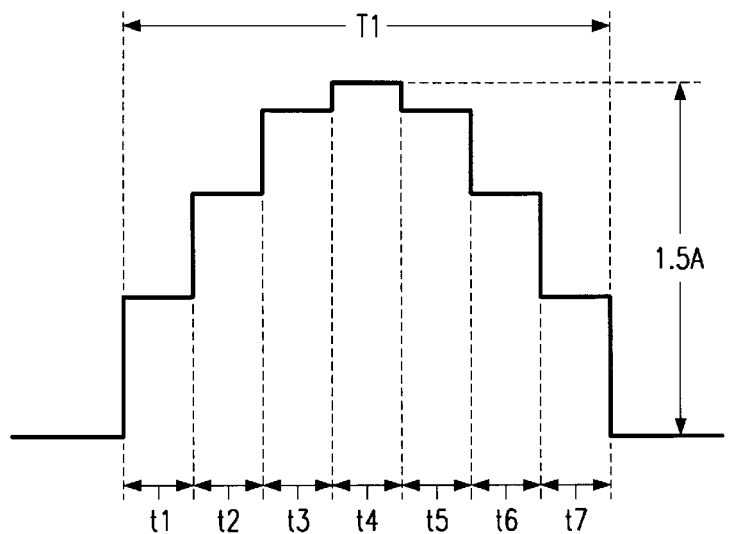
FIG. 9 is a drawing showing a model microstep waveform.

The procedure to form such a microstep waveform will be explained for the case in which 0.5 magnification is used, as an example. FIG. 9 is a drawing showing a model microstep waveform in one drive pulse formed in the case.

Where mode setting signal SigM from CPU 103 is "H", microstep generating circuit 203 sets the microstep control mode and seeks interval T1 of the excitation alternating signal from U/D counter 201. It then refers to the number of step divisions in the table data sent from current control circuit 205. Since, according to the table shown in FIG. 8, the pulse is divided into four steps including the highest step for a half interval of phase alternation when the magnification is 0.5, the pulse is divided into seven steps for the entire interval. Consequently, T1 is divided by seven and intervals t1 through t7 for each of the steps are sought.

The drive currents needed for each step are then calculated based on the value of largest drive current (1.5 [A]) (see FIG. 7) and the current percentage for each step (100 percent, 93 percent, 71 percent and 40 percent) (see FIG. 8) stored in the table data from current control circuit 205, and in order to apply the calculated amounts of current to each phase, microstep generating circuit 203 seeks the number of ON clock signals to be generated for each of intervals t1 through t7.

If, for example, the numbers of ON clock signals needed per unit time to obtain prescribed amounts of drive current are sought in advance and this information is stored in the internal memory of microstep generating circuit 203 in the form of a table, the number of ON clock signals needed may be easily determined by referring to the table when necessary.

If the number of ON clock signals necessary to obtain the largest drive current (100 percent at 1.5 [A]) and currents equal to 93 percent, 71 percent and 40 percent of the largest current are N1, N2, N3 and N4, respectively (N1>N2>N3>N4), microstep generating circuit 203 sends N4 ON clock signals for interval t1, N3 ON clock signals for interval t2, N2 ON clock signals for interval t3, N1 ON clock signals for interval t4, N2 ON clock signals for interval t5, N3 ON clock signals for interval t6 and N4 ON clock signals for interval t7.

The ON clock signals from microstep generating circuit 203 are input to each AND circuit 204 in synchronization with the excitation signal from excitation signal generating circuit 202 upon the detection of the rising edge of an excitation alternating signal. Therefore, each time an ON clock signal is generated during each excited phase alternating interval shown in FIG. 5, an ON signal is generated from the corresponding AND circuit 204.

Current flows to transistor 207 each time an ON clock signal is generated and a prescribed amount of current flows to the coils of a particular phase. Based on the increase in the number of ON clock signals output over the interval of one step, the period in which the transistor is ON is controlled and the amount of current that flows per unit of time increases. This increases the average amount of current that flows during one step interval. Because the size of the drive torque that works on stepping motor 36 depends on the amount of current per unit time that is impressed to the phases, by controlling the number of ON clock signals in this way, microstep driving that is equivalent to what is shown in FIG. 9, in which the value of the current changes in step-like fashion, may be performed.

During microstep driving, because the cycle of an ON clock signal is set to be sufficiently short, torque ripple is not likely to be caused in stepping motor 36 due to this cycle.

Figure 10:
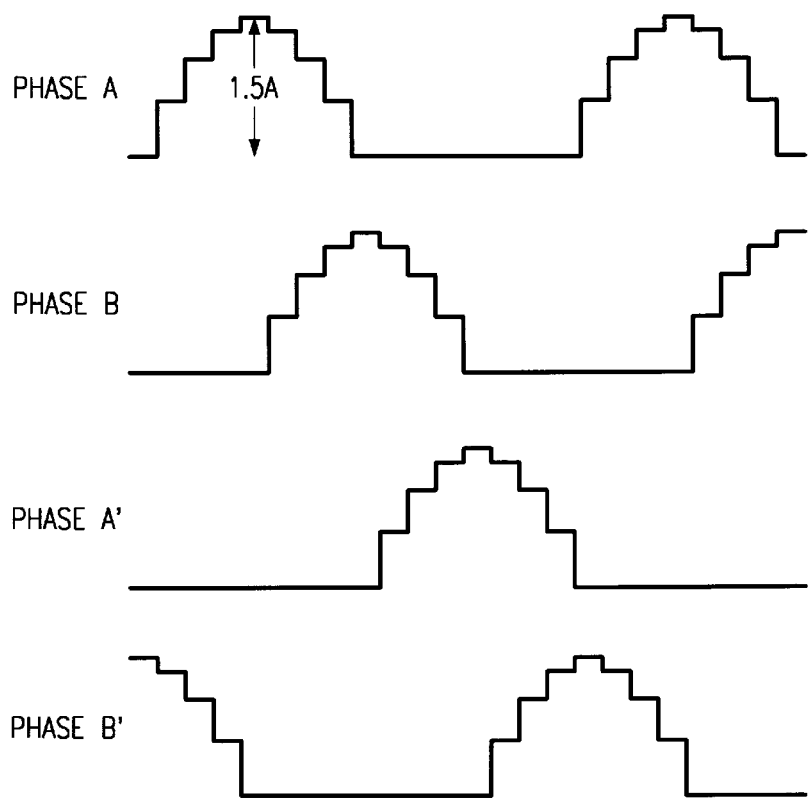
FIG. 10 is a drawing showing the changes in drive pulses impressed to each of the phases when the magnification is 0.5 during microstep driving.

FIG. 10 is a drawing that shows the changes in drive current impressed to each phase where two-phase excitation is performed using microstep control described above when the magnification is set to be 0.5.

Figure 11:
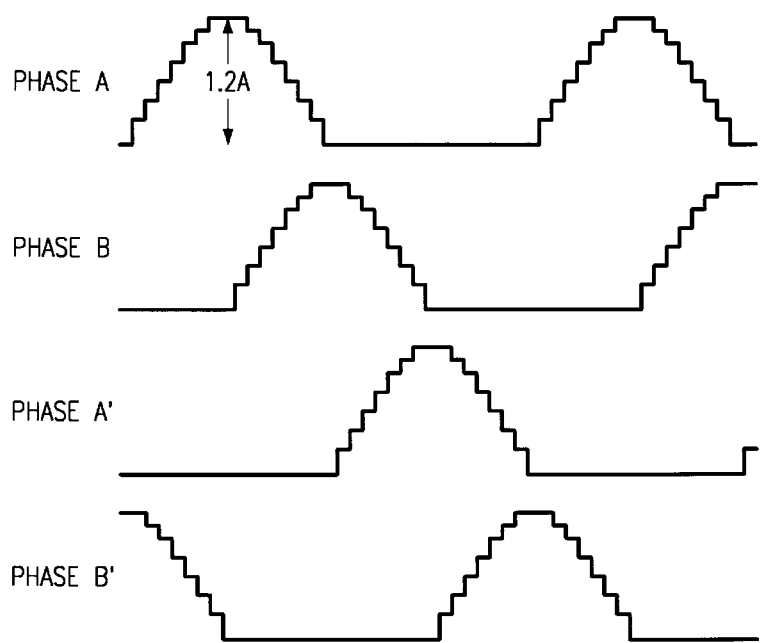
FIG. 11 is a drawing showing the changes in drive pulses impressed to each of the phases when the magnification is 1.0 during microstep driving.
Figure 12:
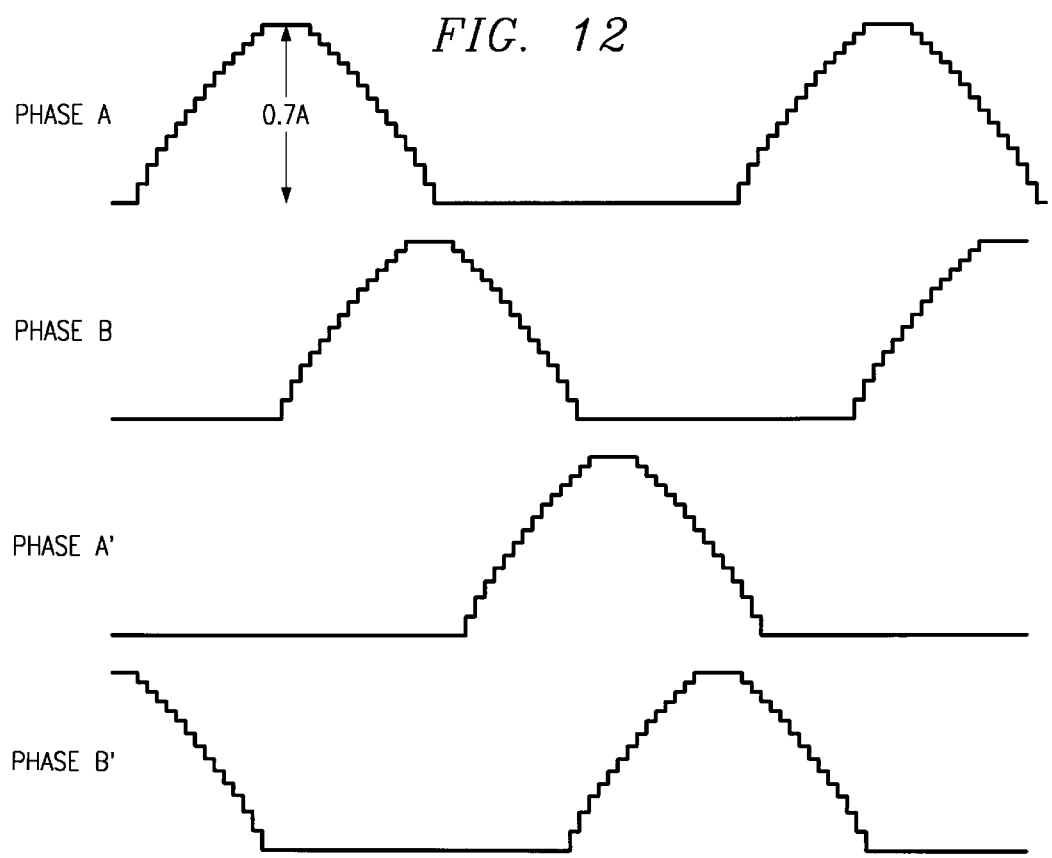
FIG. 12 is a drawing showing the changes in drive pulses impressed to each of the phases when the magnification is 2.0 during microstep driving.

The same microstep control is performed in the cases of 1.0 or 2.0 magnification based on the table data of FIGS. 7 and 8, and drive current having the microstep waveforms shown in FIGS. 11 and 12 are impressed to each phase, respectively.

As can be seen from these FIGS. 10 and 11 and the tables of FIGS. 7 and 8, the larger the magnification, i.e., the lower the scanning speed, the lower the setting for the largest drive current. On the other hand, the number of step divisions increases to increase resolution. Consequently, where there is a reduction in scanning speed and load torque when a large magnification is used, a reduction also occurs accordingly in the largest drive current and drive torque. Therefore, an imbalance between the load torque and drive torque does not easily occur. Further, as a result of the increase in the microstep resolution, first slider unit 31 and second slider unit 32 can be moved at a stable scanning speed without vibration, and highly accurate scanning of an original document may be realized.

Current detecting circuit 208 in FIG. 4 detects the value of the current that flows to the coils of each phase when ON signals are output from AND circuit 204. If this value of current is not within a prescribed range, control with regard to the drive current in accordance with the table in current control circuit 205 cannot be performed. Therefore, microstep generating circuit 203 changes the number of ON clock signals based on this detected value of current and outputs the corrected number of ON clock signals. Specifically, if the detected value is lower than a predetermined reference value, microstep generating circuit 203 increases the number of ON clock signals accordingly. If the detected value is higher than the reference value, it reduces the number of ON clock signals accordingly. The increase or decrease may easily be determined by referring to a table that shows the relationship between the difference of the reference value and the detected value and the number by which the ON clock signals should be increased or decreased, the table having been created and stored in advance in the internal memory of microstep generating circuit 203, for example.

Figure 13:
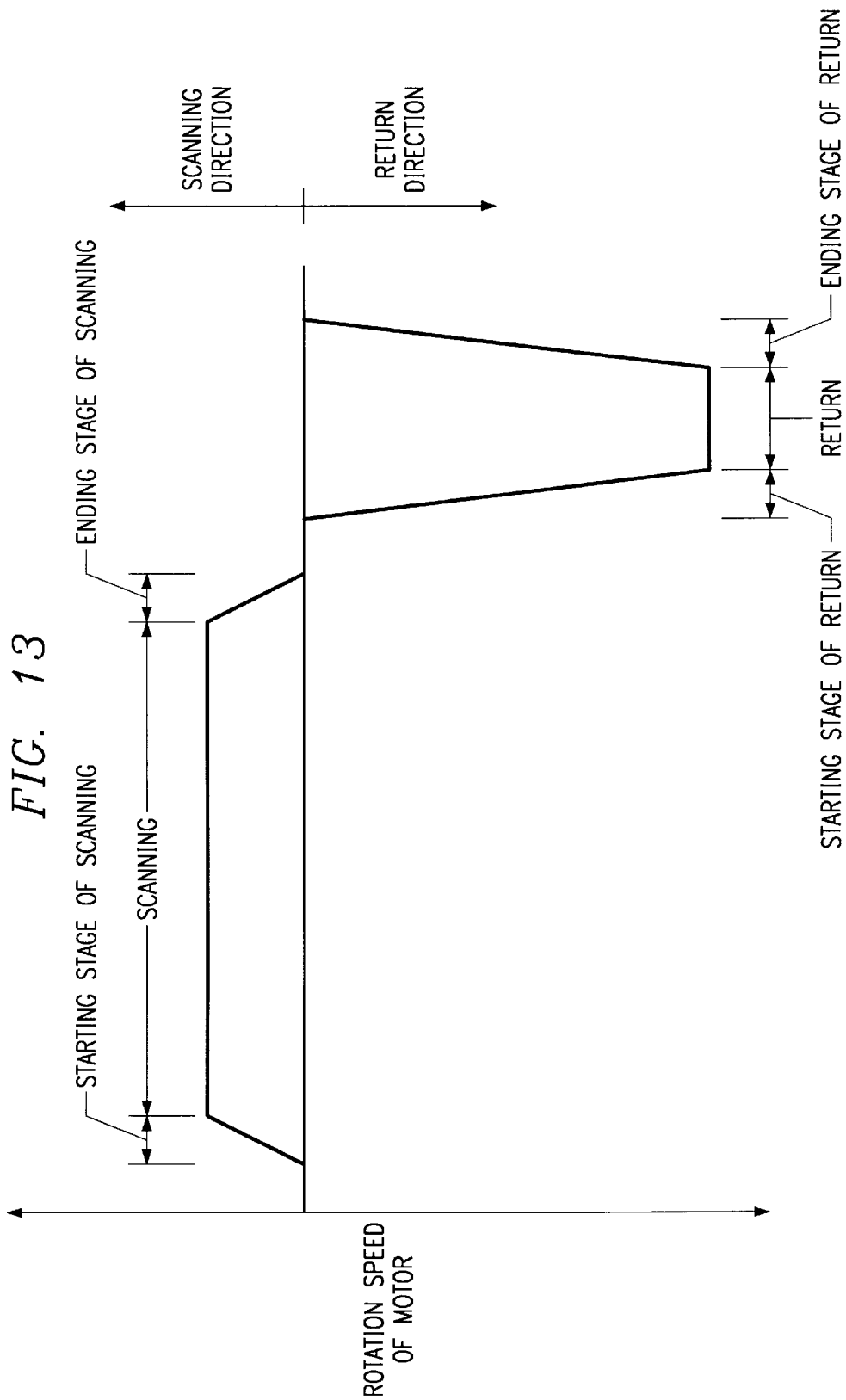
FIG. 13 is a drawing showing the rotation operation of a stepping motor for a scanner from the start of scanning to the return of the scanner to its initial scan position.

Finally, the rotation operation of stepping motor 36 that is controlled by scanner drive circuit 200 described above will be explained with reference to the timing chart shown in FIG. 13.

In this drawing, the horizontal axis represents time while the vertical axis represents the rotation direction and rotation speed of stepping motor 36. As shown in this timing chart, the rotation operation of stepping motor 36 is controlled such that first slider unit 31 will accelerate to the scanning speed from a stationary state (starting stage of scanning), maintain the scanning speed (scanning of the original document), and reduce speed after scanning in order to stop (ending stage of scanning), as well as such that first slider unit 31 will accelerate in the opposite direction to return to the initial scan position (starting stage of return), return to the position at a high speed (return), and reduce speed near the initial scan position in order to stop (ending stage of return).

The pattern of drive control is stored in ROM 113 (FIG. 3), and CPU 103 reads out this program and executes the control routine when it receives a scan request from CPU 104.

In other words, CPU 103 sends to U/D counter 201 speed setting signals SigV, the cycles of which become gradually shorter, and rotation direction setting signal SigD that indicates clockwise rotation, and sends "L" level mode setting signal SigM to microstep generating circuit 203. Based on these signals, stepping motor 36 is accelerated with a large torque in clockwise rotation using rectangular wave driving for the starting stage of scanning. Because the emphasis is on a quick transition from the stationary state to the scanning speed, rather than on having minimal vibration, rectangular wave driving in which a large torque can be obtained is carried out in the starting stage of scanning as described above.

When first slider unit 31 reaches the prescribed scanning speed, CPU 103 sends "H" level mode setting signal SigM to microstep generating circuit 203, and sends to current control circuit 205 resolution setting signals Sig1 and Sig2 that correspond to the desired magnification and drive current to be set, as well as largest current setting signals Sig3 and Sig4, so that microstep driving will be performed and minimal vibration will occur.

When the scanning of the original document is completed, it is necessary to stop the scanner as quickly as possible in order to begin the return operation. Therefore, in the ending stage of scanning, the same rectangular wave driving that was used for the starting stage of scanning is performed to reduce the speed of the scanner and stop it.

When the scanner is returned to the initial scan position, because the process has nothing to do with the scanning of the original document and speed is more important than reduction in vibration, CPU 103 sends counterclockwise rotation direction setting signal SigD to U/D counter 201, and sends "L" level mode setting signal SigM to microstep generating circuit 203. The scanner is quickly accelerated to the initial scan position using rectangular wave driving in which a large torque may be obtained, and after the scanner is returned at the fastest speed possible, the speed is rapidly reduced such that the scanner is stopped at a prescribed initial scan position.

Based on the operation described above, the scanner is returned at a high speed using a high-torque stepping motor such that the image reading speed per unit time, i.e., copying efficiency (CPM), can in turn be improved. At the same time, minimal vibration occurs during the scanning of the original document and highly accurate image reading may be achieved.

The control signals from CPU 103 are conventional speed setting signals SigV, rotation direction setting signals SigD, mode setting signals SigM, resolution setting signals Sig1 and Sig2, and largest current setting signals Sig3 and Sig4 only, and therefore it is not necessary to use a CPU having a very high processing speed or resolution, and as a result the cost of the device may be maintained at the current level.

(4) Variations

While the explanation provided above is based on one embodiment of the present invention, the present invention is not limited to the embodiment only. It may be realized in the variations set forth below.

(4-1) In FIGS. 7 and 8 regarding the embodiment described above, the numbers of steps and largest drive current values that correspond to three magnifications only are shown. However, if the magnification can be set in 0.01 increments, for example, and the number of steps and largest drive current value for each magnification are stored in the form of a table, more detailed and highly accurate scanning of the original document becomes possible.

(4-2) In the embodiment described above, microstep driving in which minimal vibration occurs is used only during scanning of the original document, and high-torque rectangular wave driving is used for other situations. However, where the number of original documents is rather small and having minimal vibration is more important than improving the copying efficiency (CPM), the scanner return operation may be carried out based on microstep driving using the same control as used in the case of 0.5 magnification described above, for example.

The alternative-phase excitation method may be used for driving in place of the two-phase excitation method.

(4-3) In the embodiment described above, an explanation was provided with reference to the situation in which a two-phase stepping motor is controlled, but it is also acceptable if a three-phase stepping motor is used. In this case, the number of excitation signals output from excitation signal generating circuit 202 (FIG. 4) and the numbers of AND circuits 204 and transistors 207 also increase, but the basic control method is essentially the same as in the embodiment.

Since the construction of a two-phase stepping motor entails differences in magnetic flux between the phases, when microstep driving is carried out, the amount of movement per step can easily vary. In contrast, if a three-phase stepping motor is used, because the construction does not entail differences in magnetic flux between the phases, when microstep driving is used, it is easier for the amount of movement per step to be constant, whereupon better accuracy in rotation can be obtained. Therefore, if such a three-phase stepping motor is used for stepping motor 36, it becomes possible to provide an image reader that has even better scanning accuracy.

(4-4) In the embodiment described above, drive current per step is obtained by controlling the number of ON clock signals to be output during the interval of each step during microstep driving by means of microstep generating circuit 203, but the same result may be obtained if the duration in which current flows to transistor 207 per step is controlled by controlling the "ON" duration of the ON clock signals.

In the embodiment described above, a microstep waveform is formed using digital control, but a microstep waveform may be similarly formed if the construction is such that different values of current are impressed by virtue of alternating analog switches for each step.

(4-5) With regard to the embodiment described above, an explanation was provided with reference to an example in which the image reader of the present invention was applied in an analog copying machine, but the image reader may be applied in all types of devices in which it is necessary to scan images by moving the scanner or the original document, such as digital copying machines or image scanners for computers.

Obviously, many modifications and variation of the present invention are possible in light of the above teachings. It is therefore to be understood that within the scope of the appended claims, the invention may be practiced other than as specifically described.

What is claimed is:

1. An image reader, comprising:
   a reading device to read an image of an original document;
   a drive device, including a stepping motor, to cause the reading device to move relative to an original document from an initial scan position, parallel to a surface of the original document, at a prescribed scanning speed;
   a controller that effects microstep driving by controlling a drive current impressed to said stepping motor such that impression of said drive current is carried out in a prescribed plurality of steps; and
   a current changer to change a largest value of said drive current in response to a scanning speed of said reading device.

2. An image reader as claimed in claim 1, wherein said current changer is adapted to reduce said largest value of said drive current in response to a decrease in said scanning speed of said reading device.

3. An image reader as claimed in claim 1, wherein said controller is adapted to change said plurality of steps in response to a scanning speed of said reading device.

4. An image reader as claimed in claim 3, wherein said controller is adapted to increase said plurality of steps as said scanning speed of said reading device decreases.

5. An image reader as claimed in claim 1, wherein when said reading device returns to said initial scan position, said controller is adapted to fix said drive current for said stepping motor to a prescribed value.

6. An image reader as claimed in claim 5, wherein said controller includes a selector which selects between driving by a fixed current and driving by said plurality of steps.

7. An image reader, comprising:
   a reading device to read an image of an original document;
   a drive device, including a stepping motor, to cause said reading device to move parallel to a surface of a original document from an initial scan position at a prescribed scanning speed;
   a controller to perform microstep driving by controlling a drive pulse impressed to said stepping motor such that impression of said drive pulse is carried out in accordance with a prescribed resolution power; and
   a changer to change said resolution power of said drive pulse in response to a scanning speed of said reading device.

8. An image reader as claimed in claim 7, said changer is adapted to increase said prescribed resolution power for each drive pulse as said scanning speed decreases.

9. An image reader as claimed in claim 7, wherein when said reading device returns to said initial scan position, said stepping motor is controlled by a rectangular waveform based on fixed-current pulses.

10. An image reader, comprising:
    a reading device to read an image of an original document;
    a drive device, having a stepping motor, to cause said reading device to move from an initial scan position and relative to an original document, parallel to a surface of the original document, at a prescribed scanning speed; and a controller to perform microstep driving by controlling a drive pulse impressed to said stepping motor such that impression of said drive pulse is carried out in a prescribed resolution power;

wherein when said reading device returns to said initial scan position, said controller controls said stepping motor by a rectangular waveform based on fixed-current pulses.

11. An image reader as claimed in claim 10, wherein said controller includes a selector which selects between driving by a fixed-current pulse and microstep driving.

12. A drive control apparatus, comprising:

a driving device, having a stepping motor, to cause a driven member to move in a prescribed direction at a prescribed speed from an initial drive position;

a controller to perform microstep driving by controlling a drive current impressed to said stepping motor such that impression of said drive current is carried out in a prescribed resolution power; and a changer to change a largest value of said drive current and said resolution power in response to a speed of said driven member.

13. A method of driving a reading device of an image reading apparatus, said image reading apparatus having a stepper motor, parallel to an original document and relative to an initial scan position at a prescribed scanning speed, said method comprising the steps of:

performing microstep driving of the reading device by controlling a drive current impressed to said stepping motor such that impression of said drive current is carried out in a prescribed plurality of steps; and changing a largest value of said drive current in response to a scanning speed of said reading device.

14. A method of driving a reading device of an image reading apparatus, said image reading apparatus having a stepper motor, parallel to an original document and relative to an initial scan position at a prescribed scanning speed, comprising the steps of:

performing microstep driving of the reading device by controlling a drive pulse impressed to said stepping motor such that impression of said drive pulse is carried out in a prescribed resolution power; and changing a resolution power of said drive pulse in response to a scanning speed of said reading device.

* * * * *